(No Model.)

H. C. ANDERSON.
ANIMAL TRAP.

No. 451,745. Patented May 5, 1891.

Witnesses

H. C. Anderson
Inventor

UNITED STATES PATENT OFFICE.

HENRY CLAY ANDERSON, OF WHITESBOROUGH, TEXAS, ASSIGNOR OF ONE-HALF TO W. P. GARVIN, OF SAME PLACE.

ANIMAL-TRAP.

SPECIFICATION forming part of Letters Patent No. 451,745, dated May 5, 1891.

Application filed December 10, 1890. Serial No. 374,158. (No model.)

*To all whom it may concern:*

Be it known that I, HENRY CLAY ANDERSON, a citizen of the United States of America, residing at Whitesborough, in the county of Grayson and State of Texas, have invented certain new and useful Improvements in Animal-Traps, of which the following is a specification, reference being had therein to the accompanying drawings.

My invention relates to improvements in animal-traps, and relates especially to what are known as "jaw-traps."

The leading object of my invention is the provision of a trap which will be certain in action, insuring the killing of the animal, and which will be capable of catching two animals.

A further object of my invention is the provision of trap which can be easily set and which is effective in operation, which is durable, and can be produced at a small cost, thus possessing all the features of merit necessary in a device of this character.

To attain the desired objects my invention consists in a double trap and in the construction, combination, and adaptation of parts substantially as herein shown, described, and specifically defined and distinguished by the claims.

Figure 1:
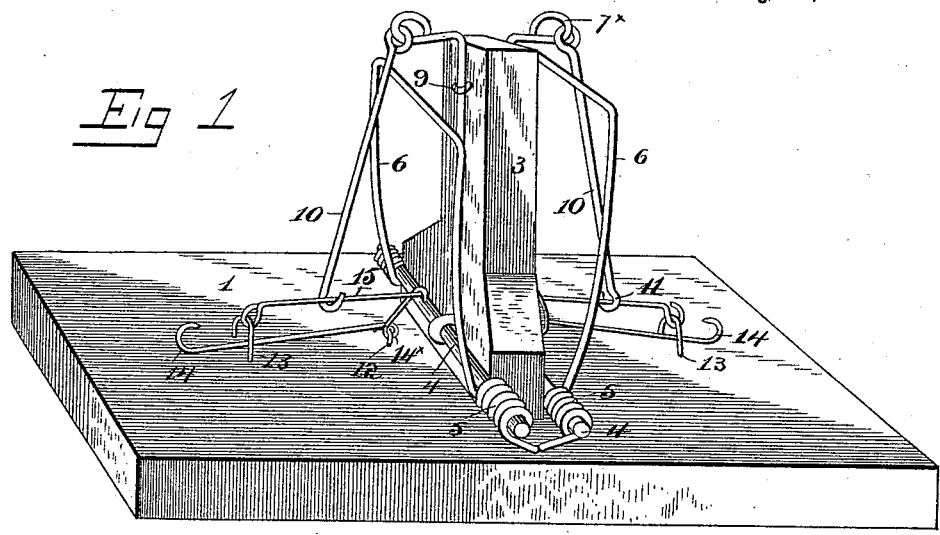
Figure 2:
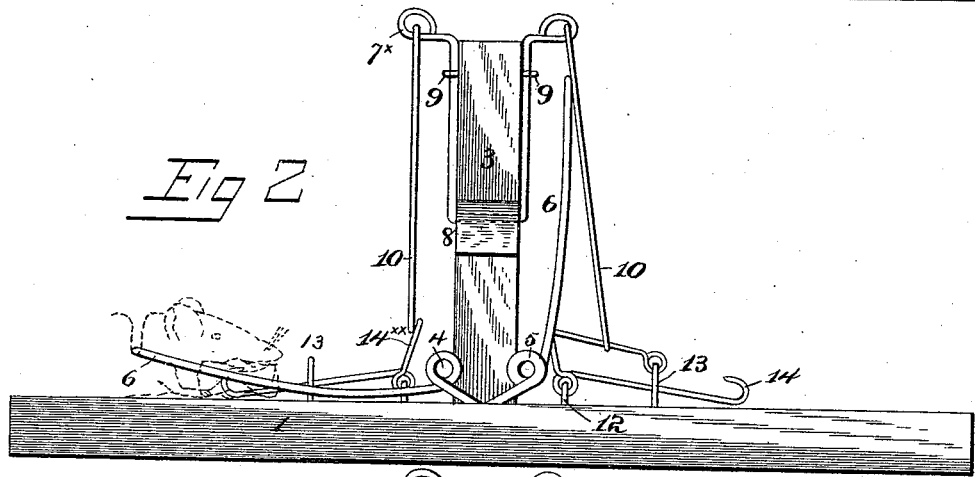
Figure 3:
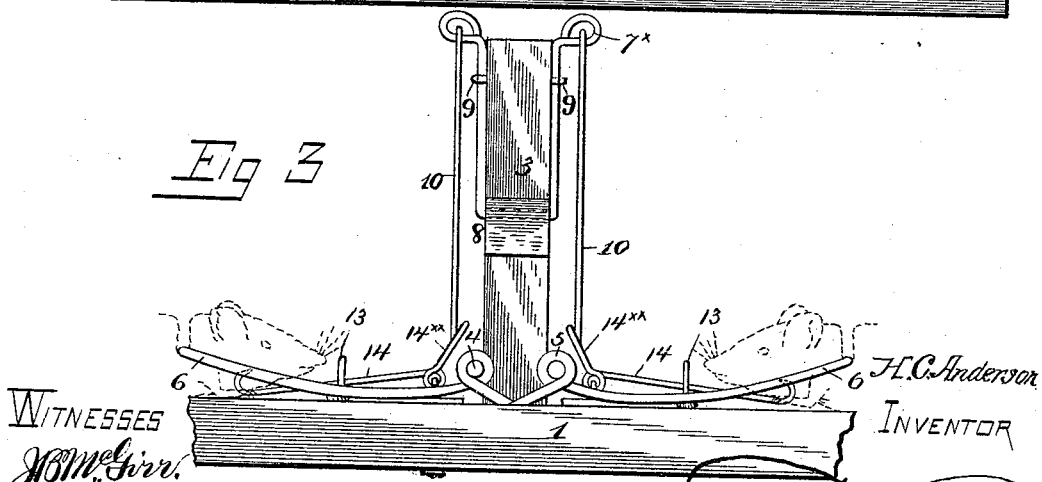

Figure 1 represents a perspective view of a trap constructed in accordance with and embodying my invention, both jaws and spring-yokes being set. Fig. 2 represents a side view, the one jaw set and the other down, a rat being shown under the latter jaw. Fig. 3 represents a side view with both jaws down, with rats shown under the jaws.

Referring by numerals to the drawings, in which similar numerals of reference denote corresponding parts in the three views, the numeral 1 denotes the base of the trap, and rising from the base at or near the center is the upright or standard 3. Passing through or mounted on the upright 3 are the shafts or studs 4, arranged upon which are the spring-coils 5 of the yokes or jaws 6, the ends of the wire forming the jaws bearing against the base. A piece of wire 7 is bent in oblong or rectangular shape, with the closed portion passing through an opening 8 in the standard 3, the arms of the wire being secured to the sides of the standard by hooks or staples 9 and the ends of the arms being provided with eyes $7^\times$, to which is connected the upper ends of the link-catches 10, having the lower hooked ends 11 for engaging the trigger, as will presently appear. To the base are secured the eyes or staples 12 and 13, the staple 13 serving as a guide for the bait hook or catch 14, which has the inner end thereof formed with an eye $14^\times$, which encircles the staple 12 and terminates in a hook $14^{\times\times}$ to receive the free end of the trigger 15, the other end of said trigger being loosely connected to the staple 13.

This being the construction, the operation will be readily understood, and briefly stated is as follows: When it is desired to set the trap, bait is placed upon the hooked ends of the bait-hooks, the jaws are elevated and retained in such position by the link-catches, which have the lower hooked ends engaging the trigger, which has its free end engaging the eye at the inner end of the bait-hooks, thus setting the trap, as is evident, and when the animal attempts to eat the bait the bait-hook is moved or tilted, which disengages the trigger from the link-catches and the jaw or jaws descend with great force upon the animal, thereby killing it.

From the foregoing description, taken in connection with the drawings, the advantages of my trap will be readily understood and appreciated, and it will be seen that my trap is thoroughly efficient for the purpose intended, is easily set and occupies but a small amount of space, and is durable and inexpensive.

Having thus fully described my invention, I claim—

1. An animal-trap consisting of a base, a standard rising from the same at or near the center, shafts secured to the standard on each side near the base, spring-jaws having their coils arranged on the ends of said shafts, arms carried by the base and having eyes or hooks at their upper ends, a link catch or catches connected to said eye or eyes, a bait hook or hooks secured to the base, and a trigger or triggers for engaging the link catch or catches and the bait hook or hooks, all arranged and adapted to operate in the manner described.

2. An animal-trap consisting of a base, a standard carried thereby, link-catches connected with the standard, spring-jaws retained by said catches, staples arranged on the base near the standard, bait-hooks having eyes intermediate of its ends to engage said staples and a hook at each end, and triggers adapted to engage the hooks on the inner ends of the bait-hooks, all substantially as described.

3. An animal-trap consisting of a base, a standard carried thereby, arms secured to the standard and formed with eyes at their upper ends, link-catches having their upper ends formed with eyes engaging the eyes of said arms and having hooks on their lower ends, spring-jaws retained by said catches, staples secured to the base, bait-hooks having eyes intermediate of their ends engaging the inner staples of the base and having their outer ends guided by the outer staples of the base, and triggers having their outer ends connected to the outer staples, their inner ends engaging the bait-hooks and adapted to be engaged by the link-catches, all adapted to operate substantially as described.

4. In an animal-trap, the combination of the link-catches and spring-jaws with the staples carried by the base, the bait-hooks having hooks at each end and an intermediate eye for engaging one of the staples, and triggers engaging the other staples and the hooks on the inner ends of the bait-hooks, substantially as and for the purpose described.

5. An animal-trap consisting of a base, a standard rising therefrom and carrying arms, link-catches connected with said arms, shafts connected to or mounted on the standard, spring-jaws having coils arranged on the shafts, staples secured to the base, bait-hooks having their outer ends passing through the outer staples and their inner ends connected to the inner staples, and triggers connected with the outer staples and engaging the bait-hooks and link-catches, as shown and described.

In testimony whereof I affix my signature in presence of two witnesses.

HENRY CLAY ANDERSON.

Witnesses:
H. H. KING,
JNO. R. ROBMETT.